(12) United States Patent
Fang et al.

(10) Patent No.: US 12,466,067 B2
(45) Date of Patent: Nov. 11, 2025

(54) MULTI-MODE ROBOT PROGRAMMING

(71) Applicant: Intrinsic Innovation LLC, Mountain View, CA (US)

(72) Inventors: Jingyi Fang, Cupertino, CA (US); Michael Christopher Degen, San Francisco, CA (US); David Andrew Schmidt, Munich (DE); Jason Harold Tucker, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 324 days.

(21) Appl. No.: 17/891,849

(22) Filed: Aug. 19, 2022

(65) Prior Publication Data
US 2024/0058963 A1 Feb. 22, 2024

(51) Int. Cl.
*B25J 9/16* (2006.01)
*B25J 13/06* (2006.01)

(52) U.S. Cl.
CPC ........... *B25J 9/1671* (2013.01); *B25J 9/1605* (2013.01); *B25J 9/1664* (2013.01); *B25J 13/06* (2013.01); *G05B 2219/40099* (2013.01); *G05B 2219/40311* (2013.01); *G05B 2219/40392* (2013.01)

(58) Field of Classification Search
CPC ........ B25J 9/1671; B25J 13/06; B25J 9/1658; B25J 9/1605; B25J 9/1664; G05B 2219/39451; G05B 2219/40099; G05B 2219/40311; G05B 2219/40392
See application file for complete search history.

(56) References Cited

U.S. PATENT DOCUMENTS

| | | | |
|---|---|---|---|
| 5,046,022 A * | 9/1991 | Conway | B25J 9/1689 |
| | | | 700/250 |
| 8,463,584 B2 | 6/2013 | Yu | |
| 9,713,871 B2 | 7/2017 | Hill et al. | |
| 9,919,416 B1 | 3/2018 | Bingham et al. | |
| 10,593,104 B2 | 3/2020 | Robert et al. | |
| 11,044,423 B2 | 6/2021 | Kester | |
| 2016/0257000 A1 * | 9/2016 | Guerin | B25J 9/1671 |
| 2018/0250822 A1 * | 9/2018 | Shimodaira | B25J 9/1697 |
| 2018/0311825 A1 * | 11/2018 | Yamamoto | B25J 9/1656 |
| 2020/0061821 A1 | 2/2020 | Linnell et al. | |
| 2020/0276708 A1 * | 9/2020 | Shah | B25J 19/04 |
| 2022/0355483 A1 * | 11/2022 | Lee | B25J 9/1671 |
| 2024/0149453 A1 * | 5/2024 | Kulläng | B25J 9/1671 |

* cited by examiner

*Primary Examiner* — Abby Lin
*Assistant Examiner* — Karston G. Evans
(74) *Attorney, Agent, or Firm* — Fish & Richardson P.C.

(57) ABSTRACT

Methods, systems, and apparatus, including computer programs encoded on computer storage media, for robot programming. One of the methods comprises generating an interactive user interface that includes an illustration of a virtual robot corresponding to a physical robot; receiving first user input data specifying a first target pose of the virtual robot; causing the physical robot to traverse to the first target pose while updating in real-time the illustration of the virtual robot as the physical robot transitions to the first target pose; receiving a user request to switch from operating in a synchronized mode to operating in an unsynchronized mode; receiving second user input data specifying a second target pose of the virtual robot; and generating an animation of the virtual robot transitioning from the first target pose to the second target pose but withholding causing the physical robot to traverse to the second target pose.

20 Claims, 5 Drawing Sheets

MULTI-MODE ROBOT PROGRAMMING

BACKGROUND

This specification relates to robotics, and more particularly to robot programming.

Robot programming refers to determining the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robot programming has traditionally required immense amounts of manual programming, even in the case of using computer simulation to simulate how a robot should move in order to accomplish a particular task. A robot can include one or more robotics arms (referred to below as "links") connected by one or more joints. Each joint can be coupled to one or more actuators and can provide a range of motion for the robot. The robot can also include an end effector, e.g., a tool, attached to one of the links, e.g., to the end of one of the links.

In some cases, robot programming involves generating data that specifies a pose of the robot, e.g., data that specifies the position, the orientation, or both of the robot. For example, robot programming can involve generating, by a developer, a target end effector position for the end effector and a target orientation of the end effector. Typically, accurate and up-to-date knowledge of the pose of the robot, e.g., with reference to a target pose or another reference pose, is a prerequisite for robot programming that results in successful task performance by the robot.

SUMMARY

This specification describes systems and techniques that allow for developers to more easily generate control instructions for operating a robot. In particular, this specification describes a multi-mode interactive user interface for robot programming that allows a developer to effectively define an end effector pose for manipulating an object by the robot.

Particular embodiments of the subject matter described in this specification can be implemented so as to realize one or more of the following advantages.

Using techniques described in this specification can dramatically reduce the amount of manual programming required in order to program robots. In particular, by offering a switching functionality within an interactive user interface for robot programming that enables and disables a synchronized mode where control instructions entered by a developer through the interface are instantly applied to a physical robot, some techniques described in this specification allow the developer to more easily and effectively define target poses, including defining target poses (e.g., target end effector poses) for robots having complex configurations, in complex robotic operating environments, or both, that facilitate custom and precise object manipulation that fit their needs. For example, some described techniques allow the developer to temporarily toggle the switch to off-state to disable the synchronized mode, such that the target poses are only reached in simulation, allowing for trial-and-error entries while avoiding unnecessary wear and tear on and potential damage to the physical robot. Some other techniques described in this application can use visual indication to intuitively emphasize any changes to the robotic operating environment that includes the robot over different time steps. Correspondingly, a developer viewing the display can generate more informed robot instructions that account for these changes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
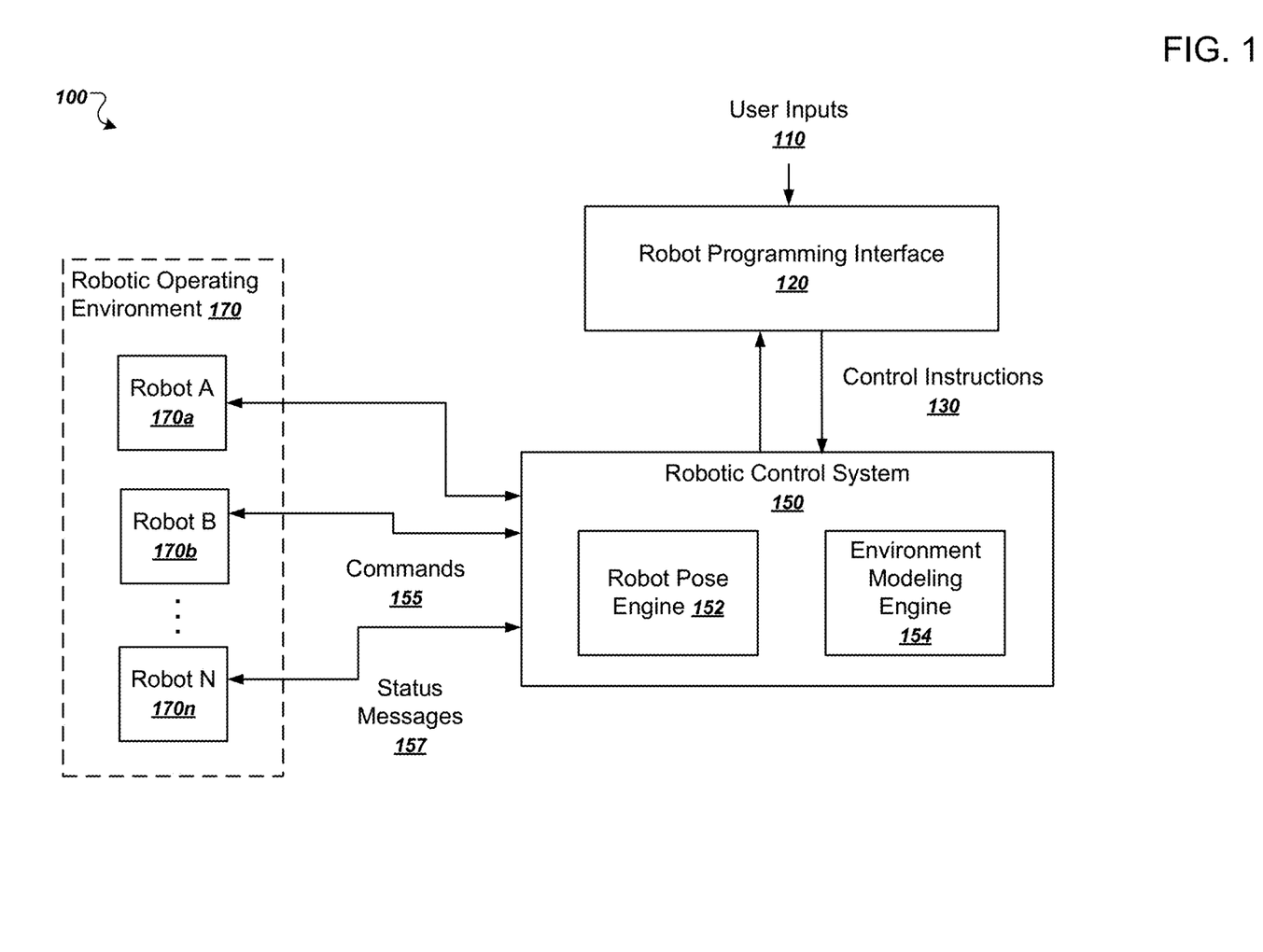
FIG. 1 is a diagram that illustrates an example system.

FIG. 1 is a diagram that illustrates an example system 100. The system 100 is an example of a system that can implement the robot programming techniques described in this specification.

The system 100 includes a number of functional components, including a robotic control system 150 that provides a robot programming interface 120 through which a user of the system, e.g., a robotics developer, may generate control instructions 130 for operating the robots, e.g., by identifying robot actions, entering parameter values, or writing robot control program code. Each of these components can be implemented as computer programs installed on one or more computers in one or more locations that are coupled to each other through any appropriate communications network, e.g., an intranet or the Internet, or combination of networks. The system 100 also includes a robotic operating environment 170 that includes N robots 170*a-n*.

The robotic control system 150 is configured to control the robots 170*a-n* in the robotic operating environment 170. For example, the robotic control system 150 can execute the instructions entered by the developer through the robot programming interface 120 by issuing commands 155 to the respective robot controllers of the robots 170*a-n* in order to drive the movements of the robots 170*a-n* and receiving status messages 157 from the robot controllers of the robots 170*a-n*.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses.

In this specification, an end effector (also referred to as a tool) is a device that is part of and is attached at the end of the kinematic chain of the one or more moveable components of the robot. Example end effectors include grasping end effectors (e.g., grippers), welding devices, gluing devices, and sanding devices.

In this specification, a task is an operation to be performed by an end effector. For brevity, when a robot has only one end effector, a task can be described as an operation to be performed by the robot as a whole. Example tasks include grasping, welding, glue dispensing, part positioning, and surfacing sanding, to name just a few examples.

The overall goal of the robot programming interface 120 is to enable the developer to more easily and accurately generate control instructions 130 for operating the robots 170a-n that allow the robots to successfully execute one or more tasks.

In this regard, the robotic control system 150 includes a robot pose engine 152 that can generate, in cooperation with the robot programming interface 120, a pose of a robot (e.g., robot 170a, robot 170b, or another robot). As described herein, the robot pose may be generated based on user inputs 110 received in response to providing an illustration of the robot to the robot programming interface 120 for presentation on a display screen of the system 150. The user inputs 110 may be generated by a developer by using one or more input devices in data communication with the system 150, e.g., a keyboard and a mouse, a joystick, a touch screen, a virtual reality, augmented reality, or mixed reality input device, or another handheld input device.

The robot pose may define a pose for the robot to manipulate an object to perform a task. In some implementations, the pose can reference a respective joint angle of each of one or more joints of the robot. In other implementations, the pose can be a pose of an end effector of the robot, which may reference a full six-dimensional ("6D") pose of the end effector that specifies both a position and an orientation of the end effector. In some of these implementations, the position of the end effector may be the position of a reference point of the end effector. The reference point of an end effector may be a center of mass of the end effector, and/or a point near where end effector attaches to other components of the robot, though this is not required.

In addition, the robotic control system 150 includes an environment modeling engine 154. The environment modeling engine 154 is programmed to generate and visualize, at the robot programming interface 120 (or a different user interface (UI) of another display device of the system), three-dimensional ("3D") scenes of the robotic operating environment 170.

The environment modeling engine 154 can employ known systems and techniques, including object detection and tracking techniques, for generating a 3D scene from sensor measurements, e.g., measurements captured by the sensor 180. The environment modeling engine 154 also consumes robot pose information that may be reported directly by the robot controller. In this way, the environment modeling engine 154 can pull 3D visualizations from different time steps and combine them into a single visualization of a 3D scene which reflects any changes to the robotic operating environment over these different time steps. The visualization provides the developer with accurate and up-to-date knowledge of the particular physical properties of the robotic operating environment, which in turn assists the developer in generating robot control instructions that result in successful task performance by the robots.

Figure 2:
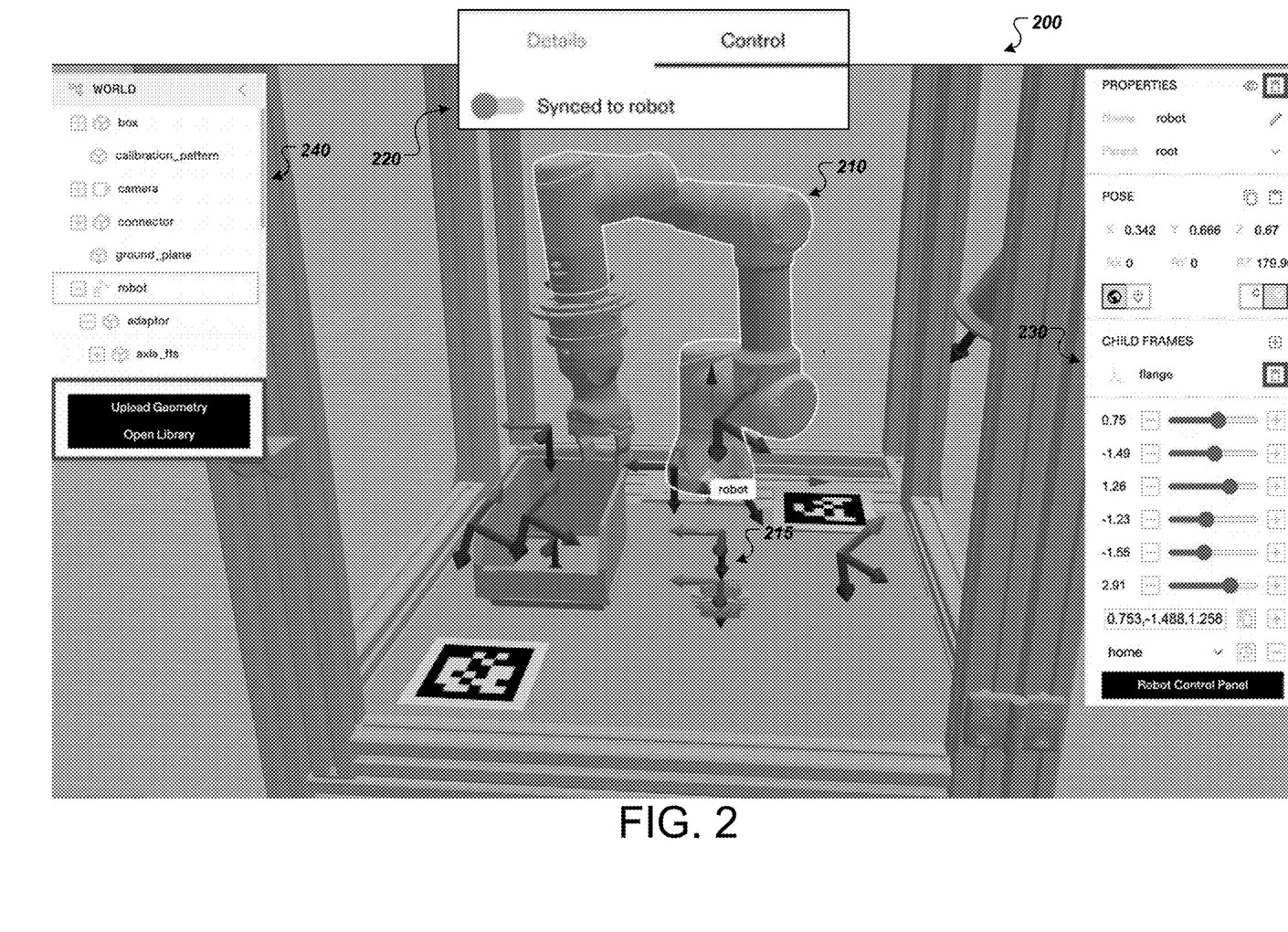
FIG. 2 illustrates an example interactive user interface for robot programming.

FIG. 2 illustrates an example interactive user interface for robot programming. The interactive user interface may be part of the robot programming interface 120 described above. As shown, the interactive user interface may include a display window 200 which shows a 3D view of a virtual robot 210, including different components of the robot such as robot base, joints, links, and optionally, an end effector. Input data collected using the visual programming interface may be used to control an actual robot that corresponds to the virtual robot 210 displayed within the display window 200

The interactive user interface includes a switching functionality that enables and disables a synchronized mode, which may be a default operation mode of the system 100, where the virtual robot 210 is a virtual replica (sometimes also referred to as a "digital twin") of an actual, physical robot (e.g., robot 170a, robot 170b, or another robot in robotic operating environment 170). At any given time point when operating in the synchronized mode, the virtual robot 210 may have a same, current pose of the physical robot in the robotic operating environment. In addition, when operating in the synchronized mode, control instructions entered by a developer through the interface may be instantly effectuated (sometimes subject to developer confirmation of the entered control instructions) on the physical robot, e.g., by issuing commands to the robotic operating environment to effectuate the control instructions.

As shown, the switching functionality may be presented in the form of a toggle switch 220, allowing for the synchronized mode to be enabled or disabled through user manipulation of the toggle switch 220. For example, a developer may toggle switch 220 from an on-state to an off-state to disable the synchronized mode. After providing control instructions through multiple trial-and-error entries, e.g., in order to finalize a desired pose for the robot, the developer may toggle the switch 220 back to the on-state to enable the synchronized mode. Alternatively, the switching functionality may correspond to a button that is clicked to enable and disable the synchronized mode of the system 100.

The interactive user interface also includes an input window 230 through which the developer can define the target pose of the virtual robot 210, i.e., with reference to a predetermined coordinate frame. The target pose (which may for example be one of the three arrows, e.g., arrows 215, illustrated in FIG. 2) can be defined in joint space or Cartesian space. For the joint space, the developer can define the joint angles by sliding an indicator along a slide bar corresponding to each robot joint; for the Cartesian space, the developer can define the Cartesian coordinates by directly entering the values of the coordinates.

The interactive user interface further includes an input window 240 which allows the developer to adjust aspects of a virtual robotic operating environment that has the virtual robot 210, e.g., to reflect the latest state of the actual, physical environment. As shown, the input window 240 includes a drop down list of components related to the task to be performed by a robot, including the robot actors and other components within a physical environment that may be used in the task, that may be selected by the developer. The components may be divided into a number of different categories ranging from target object, sensor, connector, to robot. One or more components from a number of different categories may be selected by a developer to affect particular aspects of the virtual environment, e.g., to edit an existing component, to create a new or delete an existing component, and the like.

The interactive user interface can generate illustrations with different presentation characteristics for the same robot, the same robotic operating environment, or both. For example, the illustration of the virtual robot 210 in the display window 200 when operating in the unsynchronized mode can be rendered differently than that in the synchronized mode. As another example, when operating in the synchronized mode, when generating control instructions, once the developer has defined a target pose but before, e.g., a user confirmation is received, a certain amount of time has elapsed since the target pose is defined, or the like, the display window 200 can generate respective illustrations of two virtual robots, with a first virtual robot having the current pose (that corresponds to the physical robot) and a second robot having the target pose (sometimes referred to as the "ghosted robot") that are rendered according to different presentation characteristics. Specifically, the virtual robot in the unsynchronized mode and the second robot having the target pose can be rendered less realistically, e.g., with extra transparency or opacity, using only an outline, using only polygons, using only solid colors, or the like.

As yet another example, when operating in the synchronized mode, the display window 200 can show illustration of virtual objects being rendered differently than the virtual robot 210. Specifically, the virtual objects may correspond to one or more physical objects in the robotic operating environment that has the physical robot, but their poses (i.e., locations and orientations) may be determined from a previous time point, e.g., from sensor measurements captured prior to the developer begins to providing control instructions for operating the robots. In contrast, at any given time point when operating in the synchronized mode, the virtual robot 210 is a virtual replica of a physical robot in the robotic operating environment, which has a same, current pose of the physical robot in the environment. To visually emphasize the difference between the pose precisions, the virtual robot can be rendered according to a first set of presentation characteristics, and the virtual objects can be rendered according to a second set of presentation characteristics that are visually distinguished from the first set of presentation characteristics. For example, the presentation characteristics may include color, fill pattern, transparency, opacity, brightness, and the like.

By using different presentation characteristics to render the virtual objects than the virtual robot in the display window 200, e.g., by graying out these objects, the developer can recognize that these objects have lower pose precision and can visually focus on the content of interest, namely the virtual robot 210, that is being displayed more realistically. Not only does this allow for the developer to more effectively generate new control instructions for the robot, but it also makes it easier to view a simulated effect of the previous robot control instructions on the robot, the robotic operating environment, or both and thereby make any further updates or revisions to the control instructions if needed.

Figure 3:
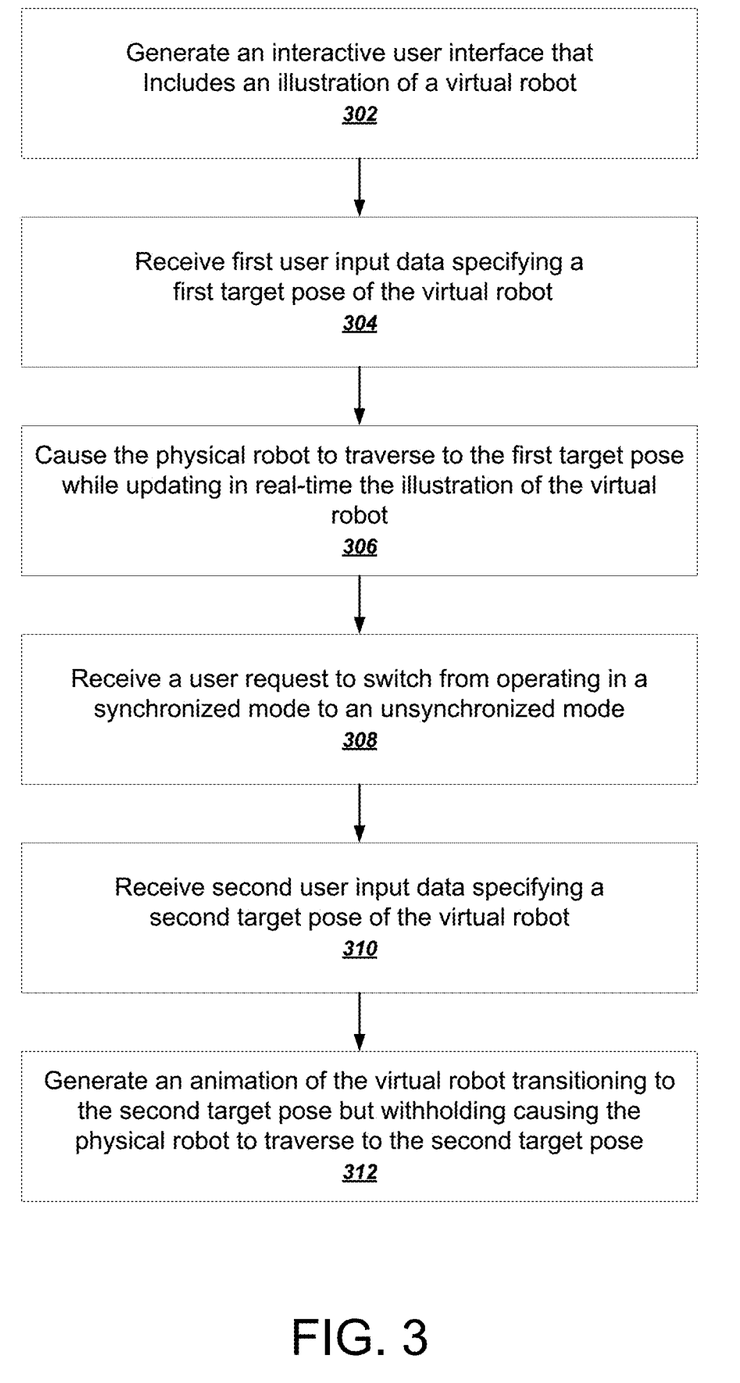
FIG. 3 is a flowchart of an example process for robot programming in a synchronized mode and an unsynchronized mode.

FIG. 3 is a flow diagram of an example process 300 for robot programming in a synchronized mode and an unsynchronized mode. For convenience, the process 300 will be described as being performed by a system of one or more computers located in one or more locations. For example, a system, e.g., the robotic control system 150 of FIG. 1, appropriately programmed, can perform the process 300. In some implementations, the synchronized mode as will be described further below is a default operation mode of the system.

The system generates an interactive user interface that includes an illustration of a virtual robot corresponding to an actual, physical robot in a robotic operating environment (step 302). The interactive user interface is a graphical interface to be displayed on a display screen of the system that allows for controlling the physical robot by a user of the system, e.g., a robotics developer. Using the provided interactive user interface, the developer may be able to generate control instructions for operating the physical robot. For example, the developer may generate pose data for the robot and subsequently cause the robot to move to a desired target pose defined in the pose data.

Figure 4A:
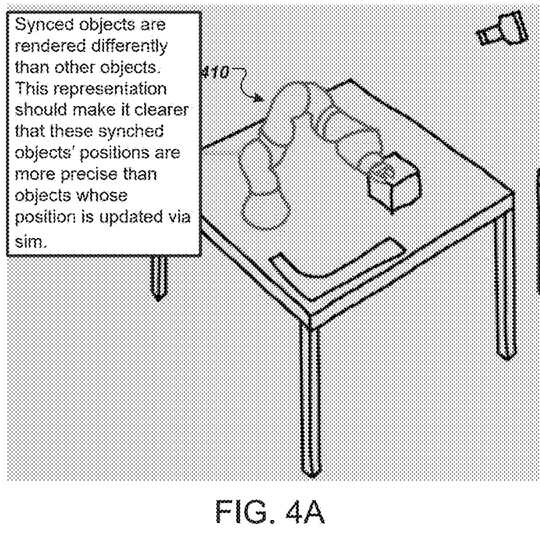
FIGS. 4A-D illustrate an example interactive user interface for robot programming in a synchronized mode.

FIGS. 4A-D illustrate an example interactive user interface for robot programming in a synchronized mode. As shown in FIG. 4A, the interactive user interface shows a 3D view of a virtual robot 410. At any given time point, the virtual robot 410 may have a same, current pose of the physical robot in the robotic operating environment. At the beginning of the process 300, the virtual robot 410 may have an initial pose (same as an initial pose of the physical robot) that defines the initial orientation of position of the virtual robot.

The system receives, within the interactive user interface, first user input data specifying a first target pose of the virtual robot (step 304). As described above, the user input data may be entered in any of a variety of ways by using one or more input devices in data communication with the interactive user interface. For example, the user input data may define or otherwise specify a target position and a target orientation of an end effector of the virtual robot with reference to a given coordinate system. As another example, the user input data may define a respective joint angle value for each of the one or more joints of the virtual robot. Suitable techniques for generating robot pose data are described in commonly owned U.S. patent application Ser. No. 17/700,133, which is herein incorporated by reference.

Figure 4B:
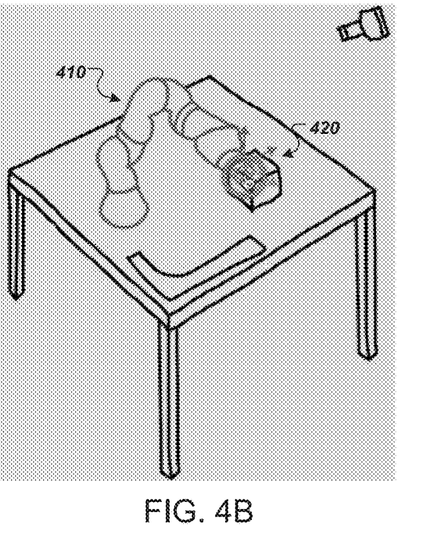

As shown in FIG. 4B, the interactive user interface receives a click-and-drag input that defines the target pose of the virtual robot illustrated as the three arrows 420. The click-and-drag input may be generated by a developer by using one or more input devices of the system, e.g., keyboard and mouse, touch screen, or a virtual reality input device.

The system causes the physical robot to traverse to the first target pose specified by the received first user input data while updating in real-time the illustration of the virtual robot as the physical robot transitions from the initial pose to the first target pose (step 306).

In some implementations, the system causes the physical robot to begin to traverse to the first target pose immediately following the entry of the first user input data while in other implementations, the system waits until, e.g., a user confirmation is received, a certain amount of time has elapsed since the first target pose is defined, or the like, before causing the physical robot to traverse to the first target pose. In other words, in some implementations, effectuation of the generated control instructions by the system when operating in the synchronized mode is subject to user confirmation.

Figure 4C:
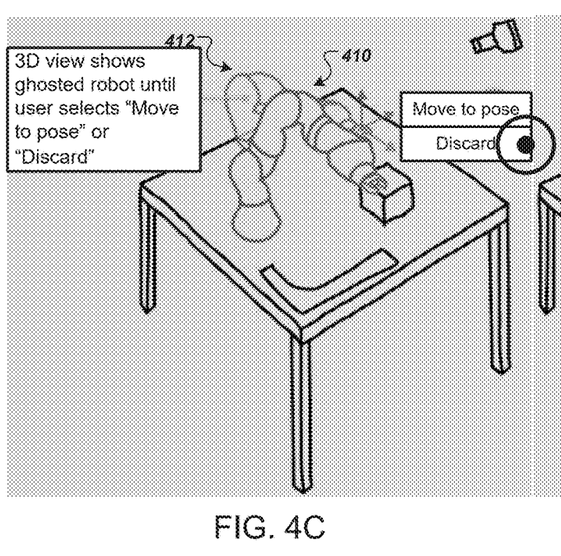
Figure 4D:
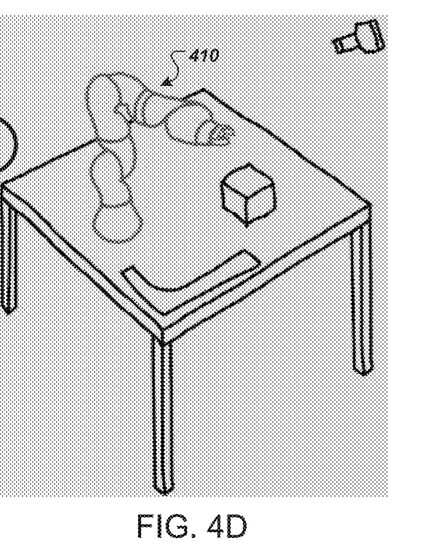

In these implementation, as shown in FIG. 4C, the system can generate a prompt for display within the interactive user interface to provide the developer with options of "move to pose" or "discard", namely to proceed with or abandon controlling the physical robot to move to the first target pose. In the example of FIG. 4C, the interactive user interface additionally includes another illustration of the virtual robot having the first target pose (the "ghosted robot") 412 that is rendered according to different presentation characteristics than the illustration of the illustration of the virtual robot having the current pose 410 (that corresponds to the physical robot). As shown in FIG. 4D, when operating in the synchronized mode, the system receives a user confirmation within the interactive user interface to move the physical robot to the first target pose and in response, causes the physical robot to traverse to the first target pose.

In addition, the system generates and displays, within the interactive user interface, an animation of the virtual robot transitioning between the initial pose and the first target pose. That is, in response to receiving the first user input data specifying the first target pose, the system causes the robot to traverse to the first target pose specified by the received data, and updates in real-time the illustration of the virtual robot as the physical robot traverses to have the first target pose. To generate the animation of the virtual robot moving to the first target pose, the system can use robot configuration data received from a robot motion controller of the robot, e.g., by streaming readings of current robot joint parameter values, to determine the current pose of the robot. The system could also use sensor data received from one or more sensors (e.g., camera, LiDAR, or radar sensors) making observations in the robot operating environment.

The system receives, within the interactive user interface, a user request to switch from operating in a synchronized mode to operating in an unsynchronized mode (step 308). This may be because the developer is attempting to generate control instructions for robots having complex configurations, in complex robotic operating environments, or both, that facilitate custom and precise object manipulation that fit their needs, and thus immediate effectuation of the trial instructions is not desired. The user request may generally be submitted through a switching functionality made available by the system within the interactive user interface. For example, the user request may be in the form of a selection or a swipe motion on a toggle switch that enables and disables the synchronized mode. As another example, the user request may be in the form of a click or double-tap motion on a particular mode switch button. As yet another example, in the cases of a virtual reality input device, the user request may be in the form of a gesture predetermined by the developer to invoke the unsynchronized mode.

Figure 5A:
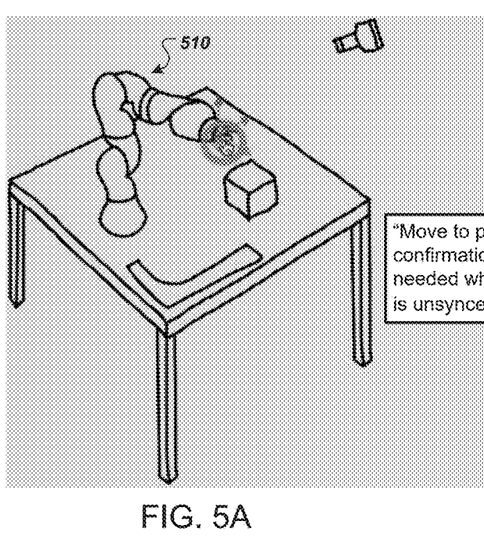
FIGS. 5A-D illustrate an example interactive user interface for robot programming in an unsynchronized mode.

FIGS. 5A-D illustrate an example interactive user interface for robot programming in an unsynchronized mode. As shown in FIG. 5A, the interactive user interface shows a 3D view of a virtual robot 510. The virtual robot 510 may have a different pose than the physical robot in the robotic operating environment.

The system receives, within the interactive user interface, second user input data specifying a second target pose of the virtual robot (step 310). The second target pose may, and generally will, be different from the first target pose. Generating user input data that specifies target poses is similarly described above with reference to step 304.

The system generates an animation of the virtual robot transitioning from the first target pose to the second target pose but withholding causing the physical robot to traverse to the second target pose (step 312). Unlike in synchronized mode where both the effectuation of the control instructions and the display of the animation showing the process of effectuation may be subject to user confirmation, the system can generate the animation immediately after receiving the second user input data and without waiting for any user confirmation when operating in unsynchronized mode.

Figure 5B:
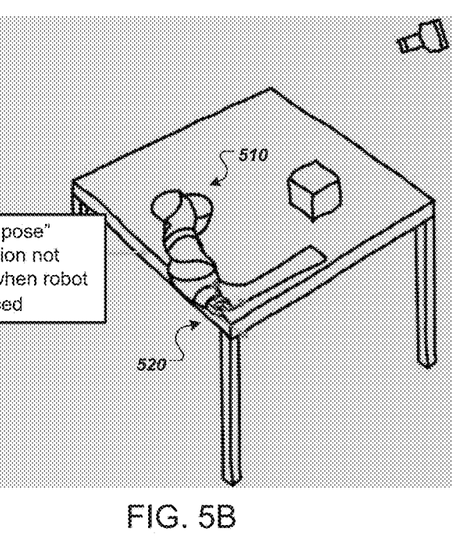

As shown in FIG. 5B, the interactive user interface shows an animation of the virtual robot transitioning to the second target pose 520 once the second user input data specifying the second target pose has been entered by the developer.

The system generates a prompt for display within the interactive user interface that a disparity exists between the current pose of the physical robot in the robotic operating environment and the second target pose of the virtual robot. For example, the system can generate this prompt whenever a user request to switch back to the synchronized mode is received. As another example, the system can generate this prompt according to a predetermined schedule, e.g., at predetermined time intervals when operating in the synchronized mode, or whenever the developer attempts to adjust the aspects of the robotic operating environment such as adding, removing, or moving an object in the environment.

The system can determine that the disparity exists by receiving robot configuration data from the motion controller of the physical robot and comparing the current pose specified in the robot configuration data against the second target pose of the virtual robot. Correspondingly, if the poses are different, e.g., if the position, orientation, or both of the end effector are different, or if one or more of the robot joint values are different, the system can determine that there exists such a disparity.

Figure 5C:
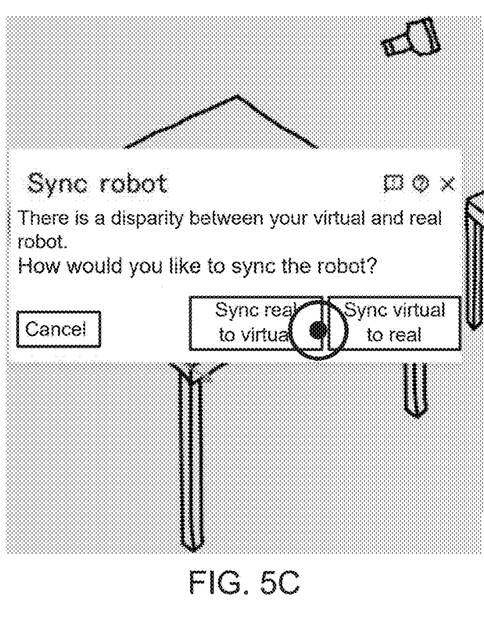
Figure 5D:
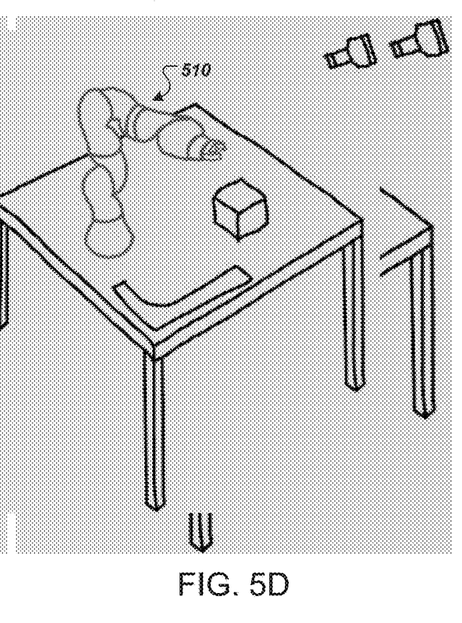

As shown in FIG. 5C, the system may receive, within the interactive user interface and when operating in the unsynchronized mode, a user confirmation to synchronize with reference to the physical robot in the robotic operating environment. In response, as shown in FIG. 5D, the system generates an animation of the virtual robot transitioning from the second target pose to the first target pose, which is the same as the current pose of the physical robot. In other words, the currently displayed virtual robot 510 reverts back to have the current pose of the physical robot, while no commands are provided by the system to actually move the physical robot in the robotic operating environment.

Alternatively, the system may instead receive a user confirmation to synchronize with reference to the virtual robot. In response, the system causes the physical robot in the robotic operating environment to traverse to the second target pose specified by the received second user input data in the unsynchronized mode, while updating in real-time the illustration of the virtual robot as the physical robot traverses to have the second target pose.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a computer-implemented method comprising:
- generating an interactive user interface that includes an illustration of a virtual robot corresponding to a physical robot in a robotic operating environment, the virtual robot having an initial pose that is identical to a current pose of the physical robot in the robotic operating environment;
- receiving, within the interactive user interface, first user input data specifying a first target pose of the virtual robot;
- causing the physical robot to traverse to the first target pose specified by the received first user input data while updating in real-time the illustration of the virtual robot as the physical robot transitions from the initial pose to the first target pose;
- receiving, within the interactive user interface, a user request to switch from operating in a synchronized mode to operating in an unsynchronized mode;
- receiving, within the interactive user interface, second user input data specifying a second target pose of the virtual robot; and
- generating an animation of the virtual robot transitioning from the first target pose to the second target pose but withholding causing the physical robot to traverse to the second target pose.

Embodiment 2 is the method of claim 1, further comprising:
- receiving, within the interactive user interface and when operating in the unsynchronized mode, a user confirmation to synchronize with reference to the virtual robot; and
- in response, causing the physical robot in the robotic operating environment to traverse to the second target pose specified by the received user input data in the unsynchronized mode.

Embodiment 3 is the method of claim 1, further comprising:
- receiving, within the interactive user interface and when operating in the unsynchronized mode, a user confirmation to synchronize with reference to the physical robot in the robotic operating environment; and
- in response, generating an animation of the virtual robot transitioning from the second target pose to the first target pose.

Embodiment 4 is the method of any one of claims 1-3, wherein generating the interactive user interface that includes the illustration of the virtual robot comprises rendering the virtual robot according to a first set of presentation characteristics.

Embodiment 5 is the method of claim 4, further comprising:
- generating an illustration of a virtual object corresponding to each of one or more objects in the robotic operating environment that has the physical robot; and
- rendering the illustrations of virtual objects according to a second set of presentation characteristics that are visually distinguished from the first set of presentation characteristics.

Embodiment 6 is the method of any one of claims 4-5, wherein the presentation characteristics comprise colors, fill patterns, transparency, or brightness.

Embodiment 7 is the method of any one of claims 1-6, wherein causing the physical robot to traverse to the first target pose comprises:
- receiving, within the interactive user interface and when operating in the synchronized mode, a user confirmation to move the physical robot to the first target pose; and
- in response, causing the physical robot to traverse to the first target pose.

Embodiment 8 is the method of any one of claims 1-7, wherein generating the animation of the virtual robot transitioning from the first target pose to the second target pose comprises generating the animation immediately after receiving the second user input data without waiting for any user confirmation.

Embodiment 9 is the method of any one of claims 1-8, wherein receiving the user confirmation to synchronize with reference to the virtual robot comprises:
- generating a prompt for display within the interactive user interface that a disparity exists between the current pose of the physical robot in the robotic operating environment and the second target pose of the virtual robot; and
- in response, receiving the user confirmation to synchronize with reference to the virtual robot.

Embodiment 10 is the method of any one of claims 1-9, wherein the current pose of the physical robot comprises a position and an orientation of an end effector of the physical robot.

Embodiment 11 is the method of claim 10, wherein the end effector comprises a grasping end effector, a welding device, or a gluing device.

Embodiment 12 is the method of any one of claims 1-11, wherein generating the animation comprises:
- receiving robot configuration data from a motion controller of the physical robot to determine the current pose of the physical robot.

Embodiment 13 is a system comprising: one or more computers and one or more storage devices storing instructions that are operable, when executed by the one or more computers, to cause the one or more computers to perform the method of any one of claims 1 to 12.

Embodiment 14 is a computer storage medium encoded with a computer program, the program comprising instructions that are operable, when executed by data processing apparatus, to cause the data processing apparatus to perform the method of any one of claims 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a robotic control system, wherein the method comprises:

generating an interactive user interface that includes a synchronized mode presentation corresponding to a synchronized mode that includes an illustration of a virtual robot corresponding to a physical robot in a robotic operating environment, the virtual robot having an initial pose that corresponds to a current pose of the physical robot in the robotic operating environment;

receiving, within the interactive user interface, first user input data specifying a first target pose of the virtual robot;

updating, within the interactive user interface, the synchronized mode presentation to include, in addition to the illustration of the virtual robot corresponding to the physical robot, an illustration of a ghost robot that has the first target pose that is different from the initial pose of the virtual robot;

causing the physical robot to traverse to the first target pose specified by the received first user input data while updating in real-time the illustration of the virtual robot as the physical robot transitions from the initial pose to the ghost robot that has the first target pose;

receiving, within the interactive user interface, a user request to switch from operating in the synchronized mode to operating in an unsynchronized mode;

receiving, within the interactive user interface and when operating in the unsynchronized mode, second user input data specifying a second target pose of the virtual robot;

generating, within the interactive user interface when operating in the unsynchronized mode, an unsynchronized mode presentation corresponding to the unsynchronized mode that includes an animation of the virtual robot transitioning from the first target pose to the second target pose but withholding causing the physical robot to traverse to the second target pose, wherein the unsynchronized mode presentation corresponding to the unsynchronized mode excludes any illustration of a ghost robot that has a different pose than the virtual robot;

receiving, within the interactive user interface, a user input to synchronize the physical robot with reference to the second target pose of the virtual robot displayed in the interactive user interface when operating in the unsynchronized mode; and in response, when operating in the unsynchronized mode, causing the physical robot in the robotic operating environment to traverse to the second target pose of the virtual robot displayed in the interactive user interface, the second target pose being specified by the second user input data received in the unsynchronized mode.

2. The method of claim 1, further comprising:

receiving, within the interactive user interface and when operating in the unsynchronized mode, another user input to synchronize the virtual robot with reference to the first target pose of the physical robot in the robotic operating environment; and in response, generating an animation of the virtual robot transitioning from the second target pose to the first target pose.

3. The method of claim 1, wherein generating the interactive user interface that includes the illustration of the virtual robot comprises rendering the virtual robot according to a first set of presentation characteristics.

4. The method of claim 3, further comprising:

generating an illustration of a virtual object corresponding to each of one or more objects in the robotic operating environment that has the physical robot; and rendering the illustrations of virtual objects according to a second set of presentation characteristics that are visually distinguished from the first set of presentation characteristics.

5. The method of claim 4, wherein the presentation characteristics comprise colors, fill patterns, transparency, opacity, or brightness.

6. The method of claim 1, wherein causing the physical robot to traverse from the current pose to the first target pose comprises:

receiving, within the interactive user interface and when operating in the synchronized mode, a user confirmation to move the physical robot to the first target pose; and in response, causing the physical robot to traverse from the current pose to the first target pose.

7. The method of claim 1, wherein generating the animation of the virtual robot transitioning from the first target pose to the second target pose comprises generating the animation immediately after receiving the second user input data without waiting for any user confirmation.

8. The method of claim 1, wherein receiving the user input to synchronize the physical robot with reference to the second target pose of the virtual robot comprises:

generating a prompt for display within the interactive user interface that a disparity exists between the current pose of the physical robot in the robotic operating environment and the second target pose of the virtual robot; and in response, receiving the user input to synchronize the physical robot with reference to the second target pose of the virtual robot.

9. The method of claim 1, wherein the current pose of the physical robot comprises a position and an orientation of an end effector of the physical robot.

10. The method of claim 9, wherein the end effector comprises a grasping end effector, a welding device, or a gluing device.

11. The method of claim 1, wherein generating the animation comprises:

receiving robot configuration data from a motion controller of the physical robot to determine the current pose of the physical robot.

12. The method of claim 1, wherein the illustration of the virtual robot is rendered according to a different set of presentation characteristics than the illustration of the ghost robot in the synchronized mode presentation corresponding to the synchronized mode.

13. One or more non-transitory computer-readable storage media storing instructions that when executed by one or more computers cause the one or more computers to perform operations comprising:

generating an interactive user interface that includes a synchronized mode presentation corresponding to a synchronized mode that includes an illustration of a virtual robot corresponding to a physical robot in a robotic operating environment, the virtual robot having an initial pose that corresponds to a current pose of the physical robot in the robotic operating environment;

receiving, within the interactive user interface, first user input data specifying a first target pose of the virtual robot;

updating, within the interactive user interface, the synchronized mode presentation to include, in addition to the illustration of the virtual robot corresponding to the physical robot, an illustration of a ghost robot that has the first target pose that is different from the initial pose of the virtual robot;

causing the physical robot to traverse to the first target pose specified by the received first user input data while updating in real-time the illustration of the virtual robot as the physical robot transitions from the initial pose to the ghost robot that has the first target pose;

receiving, within the interactive user interface, a user request to switch from operating in the synchronized mode to operating in an unsynchronized mode;

receiving, within the interactive user interface and when operating in the unsynchronized mode, second user input data specifying a second target pose of the virtual robot;

generating, within the interactive user interface when operating in the unsynchronized mode, an unsynchronized mode presentation corresponding to the unsynchronized mode that includes an animation of the virtual robot transitioning from the first target pose to the second target pose but withholding causing the physical robot to traverse to the second target pose, wherein the unsynchronized mode presentation corresponding to the unsynchronized mode excludes any illustration of a ghost robot that has a different pose than the virtual robot;

receiving, within the interactive user interface, a user input to synchronize the physical robot with reference to the second target pose of the virtual robot displayed in the interactive user interface when operating in the unsynchronized mode; and in response, when operating in the unsynchronized mode, causing the physical robot in the robotic operating environment to traverse to the second target pose of the virtual robot displayed in the interactive user interface, the second target pose being specified by the second user input data received in the unsynchronized mode.

14. A robotic control system comprising one or more computers and one or more storage devices storing instructions that when executed by one or more computers cause the one or more computers to perform operations comprising:

generating an interactive user interface that includes a synchronized mode presentation corresponding to a synchronized mode that includes an illustration of a virtual robot corresponding to a physical robot in a robotic operating environment, the virtual robot having an initial pose that corresponds to a current pose of the physical robot in the robotic operating environment;

receiving, within the interactive user interface, first user input data specifying a first target pose of the virtual robot;

updating, within the interactive user interface, the synchronized mode presentation to include, in addition to the illustration of the virtual robot corresponding to the physical robot, an illustration of a ghost robot that has the first target pose that is different from the initial pose of the virtual robot;

causing the physical robot to traverse to the first target pose specified by the received first user input data while updating in real-time the illustration of the virtual robot as the physical robot transitions from the initial pose to the ghost robot that has the first target pose;

receiving, within the interactive user interface, a user request to switch from operating in the synchronized mode to operating in an unsynchronized mode;

receiving, within the interactive user interface and when operating in the unsynchronized mode, second user input data specifying a second target pose of the virtual robot;

generating, within the interactive user interface when operating in the unsynchronized mode, an unsynchronized mode presentation corresponding to the unsynchronized mode that includes an animation of the virtual robot transitioning from the first target pose to the second target pose but withholding causing the physical robot to traverse to the second target pose, wherein the unsynchronized mode presentation corresponding to the unsynchronized mode excludes any illustration of a ghost robot that has a different pose than the virtual robot;

receiving, within the interactive user interface, a user input to synchronize the physical robot with reference to the second target pose of the virtual robot displayed in the interactive user interface when operating in the unsynchronized mode; and in response, when operating in the unsynchronized mode, causing the physical robot in the robotic operating environment to traverse to the second target pose of the virtual robot displayed in the interactive user interface, the second target pose being specified by the second user input data received in the unsynchronized mode.

15. The system of claim 14, wherein the operations further comprise:

receiving, within the interactive user interface and when operating in the unsynchronized mode, another user input to synchronize the virtual robot with reference to the first target pose of the physical robot in the robotic operating environment; and in response, generating an animation of the virtual robot transitioning from the second target pose to the first target pose.

16. The system of claim 14, wherein generating the interactive user interface that includes the illustration of the virtual robot comprises rendering the virtual robot according to a first set of presentation characteristics.

17. The system of claim 16, wherein the operations further comprise:

generating an illustration of a virtual object corresponding to each of one or more objects in the robotic operating environment that has the physical robot; and rendering the illustrations of virtual objects according to a second set of presentation characteristics that are visually distinguished from the first set of presentation characteristics.

18. The system of claim 17, wherein the presentation characteristics comprise colors, fill patterns, transparency, or brightness.

19. The system of claim 14, wherein causing the physical robot to traverse from the current pose to the first target pose comprises:
- receiving, within the interactive user interface and when operating in the synchronized mode, a user confirmation to move the physical robot to the first target pose; and
- in response, causing the physical robot to traverse from the current pose to the first target pose.

20. The system of claim 14, wherein the illustration of the virtual robot is rendered according to a different set of presentation characteristics than the illustration of the ghost robot in the synchronized mode presentation corresponding to the synchronized mode.

* * * * *